(12) United States Patent
Koishi

(10) Patent No.: US 8,948,543 B2
(45) Date of Patent: Feb. 3, 2015

(54) EXPOSURE CONDITION DECISION SUPPORT SYSTEM AND METHOD

(75) Inventor: Takeshi Koishi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 252 days.

(21) Appl. No.: 13/563,163

(22) Filed: Jul. 31, 2012

(65) Prior Publication Data

US 2013/0051704 A1 Feb. 28, 2013

(30) Foreign Application Priority Data

Aug. 31, 2011 (JP) ................. 2011-188701

(51) Int. Cl.
- *G06K 9/36* (2006.01)
- *G06K 9/00* (2006.01)
- *G06K 9/20* (2006.01)
- *G06K 9/68* (2006.01)

(52) U.S. Cl.
CPC .............. *G06K 9/2027* (2013.01); *G06K 9/685* (2013.01); *G06K 2209/27* (2013.01)
USPC .......................................... 382/305; 382/132

(58) Field of Classification Search
CPC ....... H05G 1/30; G06K 9/2027; G06K 9/685; G06K 2209/27
USPC ..................... 382/131, 132, 305; 378/62, 108
See application file for complete search history.

(56) References Cited

U.S. PATENT DOCUMENTS

| | | | | |
|---|---|---|---|---|
| 4,641,242 A | * | 2/1987 | Kimura | 250/581 |
| 5,592,374 A | * | 1/1997 | Fellegara et al. | 705/3 |
| 5,740,267 A | * | 4/1998 | Echerer et al. | 382/132 |
| 6,859,513 B2 | * | 2/2005 | Sako | 378/16 |
| 7,949,098 B2 | * | 5/2011 | Ellinwood et al. | 378/108 |
| 2004/0227821 A1 | | 11/2004 | Matsuno | |

FOREIGN PATENT DOCUMENTS

| | | |
|---|---|---|
| JP | 2004-105437 A | 4/2004 |
| JP | 2009-60939 A | 3/2009 |

* cited by examiner

*Primary Examiner* — Kanjibhai Patel
(74) *Attorney, Agent, or Firm* — Sughrue Mion, PLLC

(57) ABSTRACT

A console of an X-ray imaging system functions as a query receiver and a retrieval section to support decision on an exposure condition. The query receiver receives a retrieval query such as an exposed body portion and an exposure direction. The retrieval section refers to an exposure date of image files having the same patient ID number, and calculates an exposure interval between a pair of prior and subsequent image files the exposure dates of which are the nearest to each other. The exposure interval is compared with a threshold value. If the exposure interval is less than the threshold value, neither image file is assigned as a model image file. If the exposure interval is the threshold value or more, the subsequent image file is assigned as the model image file. The retrieval section retrieves the image file matching the retrieval query out of the model image files.

17 Claims, 10 Drawing Sheets

FIG. 3

| EXAM ID | PATIENT NAME | PATIENT ID | EXPOSURE DATE | BODY PORTION | EXPOSURE DIRECTION | DIAGNOSIS | BODY THICKNESS (mm) | TUBE VOLTAGE (kV) | TUBE CURRENT-TIME PRODUCT (mAs) |
|---|---|---|---|---|---|---|---|---|---|
| #501 | XX XXX | #00301 | 201108011015 | CHEST | FRONT PA | LUNG CANCER | 190 | 90 | 150 |
| #502 | XX XXX | #00302 | 201108051310 | ARM | FRONT AP | ARM FRACTURE | 70 | 50 | 120 |
| #503 | XX XXX | #00303 | 201108051415 | ABDOMEN | FRONT AP | UROLITHIASIS | 150 | 60 | 140 |
| #504 | XX XXX | #00301 | 201108071424 | CHEST | FRONT PA | LUNG CANCER | 190 | 90 | 160 |
| #505 | XX XXX | #00304 | 201108081432 | CHEST | FRONT PA | LUNG NODULE | 190 | 80 | 160 |
| #506 | XX XXX | #00305 | 201108091512 | CHEST | FRONT PA | LUNG CANCER | 190 | 70 | 150 |
| #550 | XX XXX | #00342 | 201108177430 | LEG | FRONT AP | LEG FRACTURE | 140 | 70 | 120 |
| #551 | XX XXX | #00343 | 201108181550 | CHEST | FRONT PA | LUNG CANCER | 160 | 70 | 140 |
| #552 | XX XXX | #00301 | 201108191011 | CHEST | FRONT PA | LUNG CANCER | 190 | 80 | 150 |
| #553 | XX XXX | #00344 | 201108211020 | CHEST | FRONT PA | LUNG CANCER | 190 | 80 | 160 |
| #554 | XX XXX | #00342 | 201108221413 | LEG | FRONT AP | LEG FRACTURE | 140 | 80 | 130 |
| #555 | XX XXX | #00345 | 201108241530 | HEAD | SIDE PA | HEAD FRACTURE | 200 | 80 | 160 |
| #556 | XX XXX | #00346 | 201108251015 | CHEST | FRONT PA | LUNG CANCER | 180 | 70 | 140 |
| #557 | XX XXX | #00347 | 201108261000 | ARM | FRONT AP | ARM FRACTURE | 70 | 50 | 120 |

SUPPLIMENTARY INFORMATION / EXPOSURE MENU / BODY INFORMATION / EXPOSURE PARAMETERS / EXPOSURE CONDITION

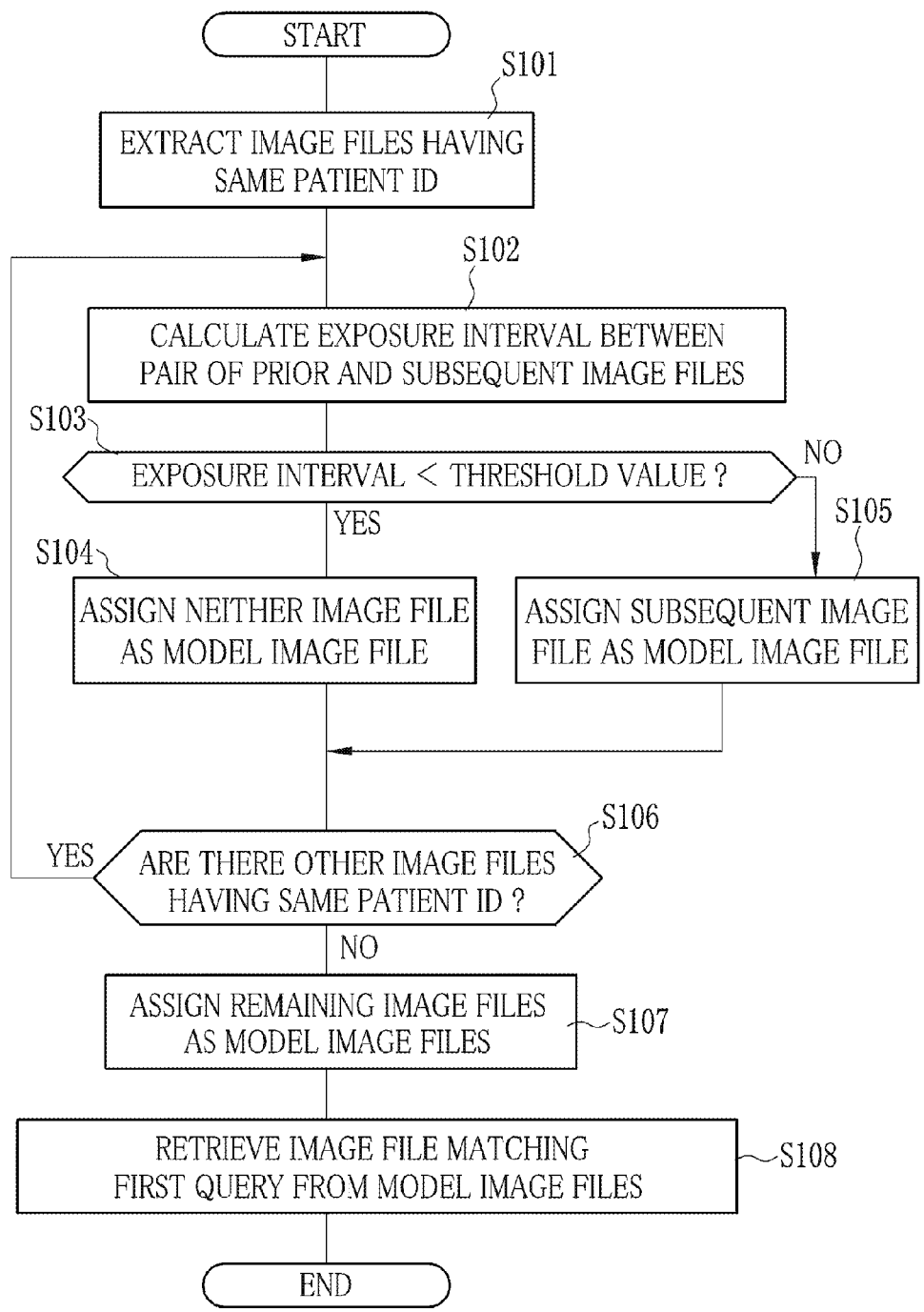

FIG. 7

| EXAM ID | PATIENT NAME | PATIENT ID | EXPOSURE DATE | BODY PORTION | EXPOSURE DIRECTION | DIAGNOSIS | BODY THICKNESS (mm) | TUBE VOLTAGE (kV) | TUBE CURRENT-TIME PRODUCT (mAs) |
|---|---|---|---|---|---|---|---|---|---|
| #502 | XX XXX | #00302 | 201108051310 | ARM | FRONT AP | ARM FRACTURE | 70 | 50 | 120 |
| #503 | XX XXX | #00303 | 201108051415 | ABDOMEN | FRONT AP | UROLITHIASIS | 150 | 60 | 140 |
| #505 | XX XXX | #00304 | 201108081432 | CHEST | FRONT PA | LUNG NODULE | 190 | 80 | 160 |
| #506 | XX XXX | #00305 | 201108091512 | CHEST | FRONT PA | LUNG CANCER | 190 | 70 | 150 |
| #551 | XX XXX | #00343 | 201108181550 | CHEST | FRONT PA | LUNG CANCER | 160 | 70 | 140 |
| #552 | XX XXX | #00301 | 201108191011 | CHEST | FRONT PA | LUNG CANCER | 190 | 80 | 150 |
| #553 | XX XXX | #00344 | 201108211020 | CHEST | FRONT PA | LUNG CANCER | 190 | 80 | 160 |
| #555 | XX XXX | #00345 | 201108241530 | HEAD | SIDE PA | HEAD FRACTURE | 200 | 80 | 160 |
| #556 | XX XXX | #00346 | 201108251015 | CHEST | FRONT PA | LUNG CANCER | 180 | 70 | 140 |
| #557 | XX XXX | #00347 | 201108261000 | ARM | FRONT AP | ARM FRACTURE | 70 | 50 | 120 |

43

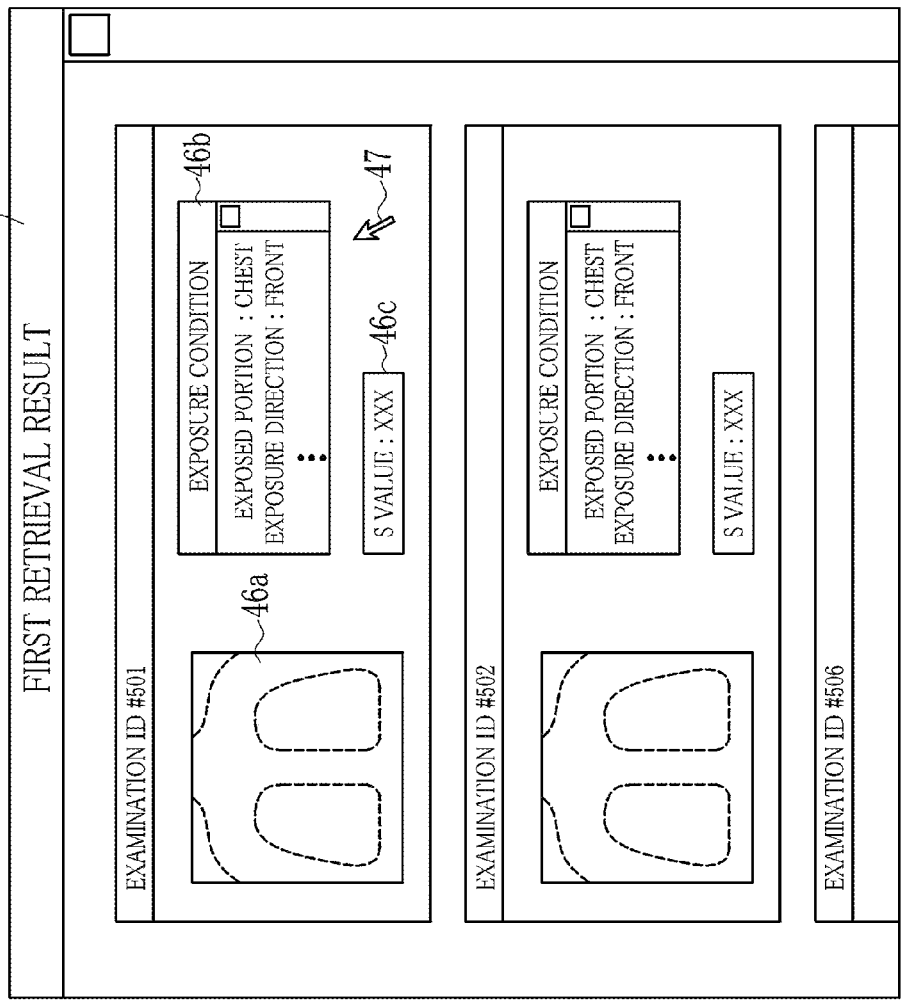

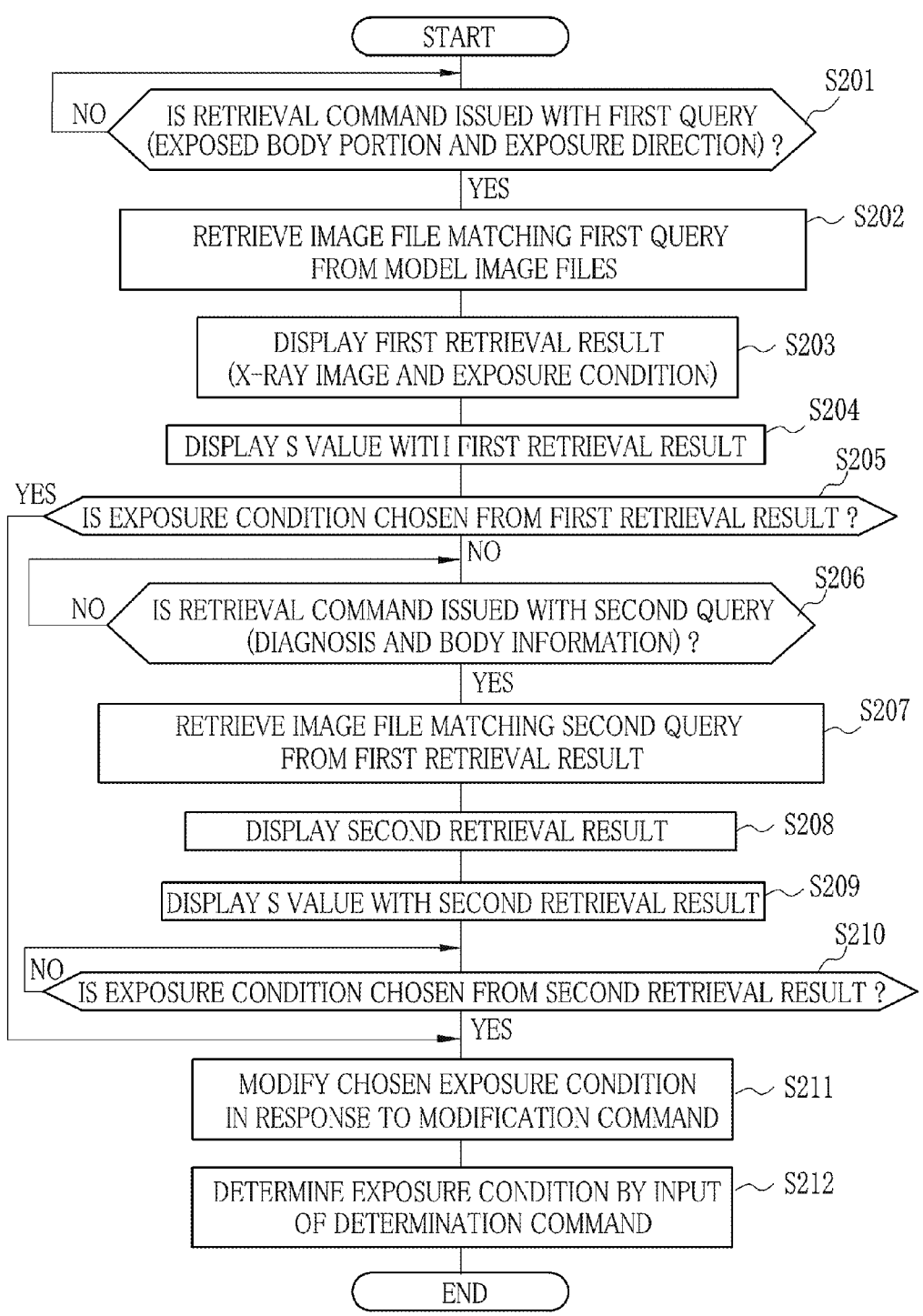

FIG. 10

| EXAM ID | PATIENT NAME | PATIENT ID | EXPOSURE DATE | IMPROPRIETY DATA | BODY PORTION | EXPOSURE DIRECTION | DIAGNOSIS | BODY THICKNESS (mm) | TUBE VOLTAGE (kV) | TUBE CURRENT-TIME PRODUCT (mAs) |
|---|---|---|---|---|---|---|---|---|---|---|
| #501 | XX XXX | #00301 | 201108011015 | FAIL | CHEST | FRONT PA | LUNG CANCER | 190 | 90 | 150 |
| #502 | XX XXX | #00302 | 201108051310 |  | ARM | FRONT AP | ARM FRACTURE | 70 | 50 | 120 |
| #503 | XX XXX | #00303 | 201108051415 |  | ABDOMEN | FRONT AP | UROLITHIASIS | 150 | 60 | 140 |
| #504 | XX XXX | #00301 | 201108071424 | RE-EXPOSURE | CHEST | FRONT PA | LUNG CANCER | 190 | 90 | 160 |
| #505 | XX XXX | #00304 | 201108081432 |  | CHEST | FRONT PA | LUNG NODULE | 190 | 80 | 160 |
| #506 | XX XXX | #00305 | 201108091512 |  | CHEST | FRONT PA | LUNG CANCER | 190 | 70 | 150 |
| #550 | XX XXX | #00342 | 201108171430 | FAIL | LEG | FRONT AP | LEG FRACTURE | 140 | 70 | 120 |
| #551 | XX XXX | #00343 | 201108181550 |  | CHEST | FRONT PA | LUNG CANCER | 160 | 70 | 140 |
| #552 | XX XXX | #00301 | 201108191011 |  | CHEST | FRONT PA | LUNG CANCER | 190 | 80 | 150 |
| #553 | XX XXX | #00344 | 201108211020 |  | CHEST | FRONT PA | LUNG CANCER | 190 | 80 | 160 |
| #554 | XX XXX | #00342 | 201108221413 | RE-EXPOSURE | LEG | FRONT AP | LEG FRACTURE | 140 | 80 | 130 |
| #555 | XX XXX | #00345 | 201108241530 |  | HEAD | SIDE PA | HEAD FRACTURE | 200 | 80 | 160 |
| #556 | XX XXX | #00346 | 201108251015 |  | CHEST | FRONT PA | LUNG CANCER | 180 | 70 | 140 |
| #557 | XX XXX | #00347 | 201108261000 |  | ARM | FRONT AP | ARM FRACTURE | 70 | 50 | 120 |

SUPPLIMENTARY INFORMATION — EXPOSURE MENU — BODY INFORMATION — EXPOSURE PARAMETERS

EXPOSURE CONDITION

EXPOSURE CONDITION DECISION SUPPORT SYSTEM AND METHOD

BACKGROUND OF THE INVENTION

1. Field of the Invention

The present invention relates to an exposure condition decision support system and method that support decision on an exposure condition of a radiation imaging system.

2. Description Related to the Prior Art

In a medical field, a radiation imaging system, for example, an X-ray imaging system using X-rays is widely known. The X-ray imaging system is constituted of an X-ray generation device for emitting the X-rays to a patient's body, and an X-ray image capturing device for taking an X-ray image of the body. The X-ray image capturing device has an X-ray image detector, which detects the X-ray image as an electrical image. As the X-ray image detector, the one using an FPD (flat panel detector) is in practical use. The FPD has a detection surface in which pixels are arranged in a matrix. Each pixel accumulates signal charge by an amount corresponding to the amount of the X-rays incident thereon. The FPD detects the X-ray image on its detection surface by accumulation of the signal charge on a pixel-by-pixel basis, and outputs the X-ray image as digital image data.

The X-ray imaging system requires determination of an exposure condition before performing radiography. The exposure condition refers to various settings necessary for operation of the X-ray generation device and the X-ray image capturing device. The exposure condition includes, for example, "exposure menu" relating to exposure contents such as an exposed body portion and an exposure direction, "body information" relating to physical information on the patient's body such as body thickness, and "exposure parameters" being a setup condition required for generation of the X-rays from the X-ray generation device, such as tube voltage and tube current-time product.

As to the exposure parameters e.g. the tube voltage and the tube current-time product, their proper values vary depending on a combination with the exposure menu and the body information. Thus, not only knowledge about the exposure condition but also sophisticated skill reinforced by experience is required of a radiological technician who determines the exposure condition. However, a skill level varies from technician to technician, and inevitably, there are relatively low-skilled radiological technicians. As is often the case, the low-skilled radiological technician takes long time to determine the exposure condition. The low-skilled radiological technician sometimes makes a mistake in the exposure condition and obtains a poor-quality image unsuitable for diagnosis. This requires another exposure to be made.

Conventionally, to allow determination of the proper exposure condition regardless of the skill level of the radiological technician, it is proposed to determine the exposure condition used in present radiography by reference to the exposure conditions used in past radiography. For example, Japanese Patent Laid-Open Publication No. 2004-105437 discloses an X-ray imaging system that stores X-ray images (hereinafter called past images) obtained in the past radiography and quality evaluation data of each past image in relation to each other, and uses the quality evaluation data as a reference to determine the exposure condition. Japanese Patent Laid-Open Publication No. 2009-060939 discloses an X-ray imaging system that receives input of the body information as a retrieval query, and the past exposure conditions are displayed in decreasing order of compatibility with the body information or decreasing order of use frequency. US Patent Application Publication No. 2004/0227821 corresponding to Japanese Patent Laid-Open Publication No. 2004-337232 discloses an X-ray imaging system that stores a failure image as an invalid image unusable for diagnosis.

According to the Japanese Patent Laid-Open Publication Nos. 2004-105437 and 2009-060939, the exposure condition of the present radiography can be determined by reference to the exposure conditions of the past images. The past images, however, include failure images and re-exposure images, in addition to model images suitable for diagnosis. The failure image denotes a poor-quality image unusable or barely used for diagnosis. The re-exposure image denotes an image obtained after the failure image by another exposure. Generally speaking, most of the failure images and re-exposure images are taken by the low-skilled radiological technician. Thus, the failure images and the re-exposure images should not be used as the reference to obtain a high-quality image.

By the way, according to the Japanese Patent Laid-Open Publication No. 2004-105437, the quality evaluation data is listed on a monitor together with the past images and the exposure conditions. Thus, checking the quality evaluation data allows avoiding the use of the failure image. In the Japanese Patent Laid-Open Publication No. 2009-060939, the past images and their exposure conditions are displayed on the monitor in decreasing order of the use frequency. The lower the use frequency, the more likely the past image is to be the failure image. Thus, choosing the past image of the high use frequency allows avoiding the use of the failure image. If the X-ray imaging system disclosed in the Japanese Patent Laid-Open Publication No. 2004-105437 or 2009-060939 is combined with the technique of the US Patent Application Publication No. 2004/0227821, by which the failure image is not displayed as the invalid image, it is possible to exclude the failure images from the reference to determine the exposure condition. However, none of the Japanese Patent Laid-Open Publication Nos. 2004-105437 and 2009-060939 describes exclusion of the re-exposure images from the reference.

SUMMARY OF THE INVENTION

An object of the present invention is to provide an exposure condition decision support system and method that can exclude not only failure images but also re-exposure images from a reference to determine an exposure condition.

To achieve the above and other objects, an exposure condition decision support system according to the present invention includes an image data storage unit, a query receiver, a model image file extracting unit, and a retrieval section. The image data storage unit stores a plurality of image files. Each image file includes data of a radiographic image, supplementary information, and an exposure condition of the radiographic image stored in relation to each other. The query receiver receives an input of a retrieval query. The model image file extracting unit extracts one or more image files having a model image of the radiographic image as model image files, exclusive of the image files having a failure image or a re-exposure image of the radiographic image, by reference to the supplementary information. The retrieval section retrieves at least one of the image files having the exposure condition matching the retrieval query out of the model image files.

It is preferable that the exposure condition decision support system further includes a monitor for displaying the radiographic image and the exposure condition of the retrieved image file.

If a plurality of image files are retrieved, the radiographic image and the exposure condition of each retrieved image file are preferably displayed in a scrollable manner on the monitor.

The supplementary information may include an ID number of a patient being an object of the radiographic image and an exposure date of the radiographic image.

The model image file extracting unit preferably performs the steps of checking whether or not there are two or more image files belonging to the same patient by reference to the ID number; if there are two or more image files belonging to the same patient, calculating an exposure interval between two of the image files belonging to the same patient by reference to the exposure date, and comparing the exposure interval with a threshold value; and if the exposure interval is less than the threshold value, judging that one of the two image files has the re-exposure image obtained by re-exposure, and assigning neither of the two image files as the model image file. If the exposure interval is the threshold value or more, the model image file extracting unit preferably omits assigning a prior image file of the two image files as the model image file.

The supplementary information may include impropriety data that indicates whether or not the radiographic image is the failure image obtained by failure in exposure or the re-exposure image obtained by re-exposure after the failure.

The retrieval section may perform first retrieval by use of a first query from the query receiver, and thereafter performs second retrieval if a second query is inputted. The first query may include an exposed body portion and an exposure direction. The second query may include at least one of body information, diagnosis, and configuration information of a radiation imaging system. The body information may include body thickness of a patient.

An index value related to a radiation dose used in taking each radiographic image is preferably displayed in list form on the monitor.

The exposure condition decision support system may further include an input device for choosing one of the image files displayed on the monitor, and a controller for adopting the exposure condition of the chosen image file as the exposure condition of next exposure.

A method for supporting decision on an exposure condition of a radiation imaging system preferably includes the steps of receiving an input of a retrieval query; extracting one or more image files having a model image of a radiographic image as model image files, exclusive of the image files having a failure image or a re-exposure image of the radiographic image, by reference to supplementary information; and retrieving at least one of the image files having an exposure condition matching the retrieval query out of the model image files.

The method may further include the steps of displaying the radiographic image and the exposure condition of each retrieved image file in a scrollable manner on a monitor; choosing one of the image files displayed on the monitor; and adopting the exposure condition of the chosen image file as the exposure condition of next exposure.

According to the present invention, the model image files reliably suitable for diagnosis are extracted based on the supplementary information, and one or more image files matching the retrieval query are retrieved from the model image files. Thereby, in support for decision on the exposure condition, it is possible to serve only exemplary models of the exposure condition of the model image files, exclusive of the exposure condition of the image files having the failure and re-exposure images.

BRIEF DESCRIPTION OF THE DRAWINGS

For more complete understanding of the present invention, and the advantage thereof, reference is now made to the subsequent descriptions taken in conjunction with the accompanying drawings, in which:

FIG. 3 is a table showing an example of the contents of DICOM tags;

FIG. 6 is a flowchart of a model image file extraction process by the console;

FIG. 7 is a table showing an example of model image files;

FIG. 8 is an explanatory view of an example of a first retrieval result window displayed after first retrieval on a monitor;

FIG. 9 is a flowchart of a console control process in determination of the exposure condition; and FIG. 10 is a table showing an example of the DICOM tags having an impropriety data entry field.

DESCRIPTION OF THE PREFERRED EMBODIMENTS

Figure 1:
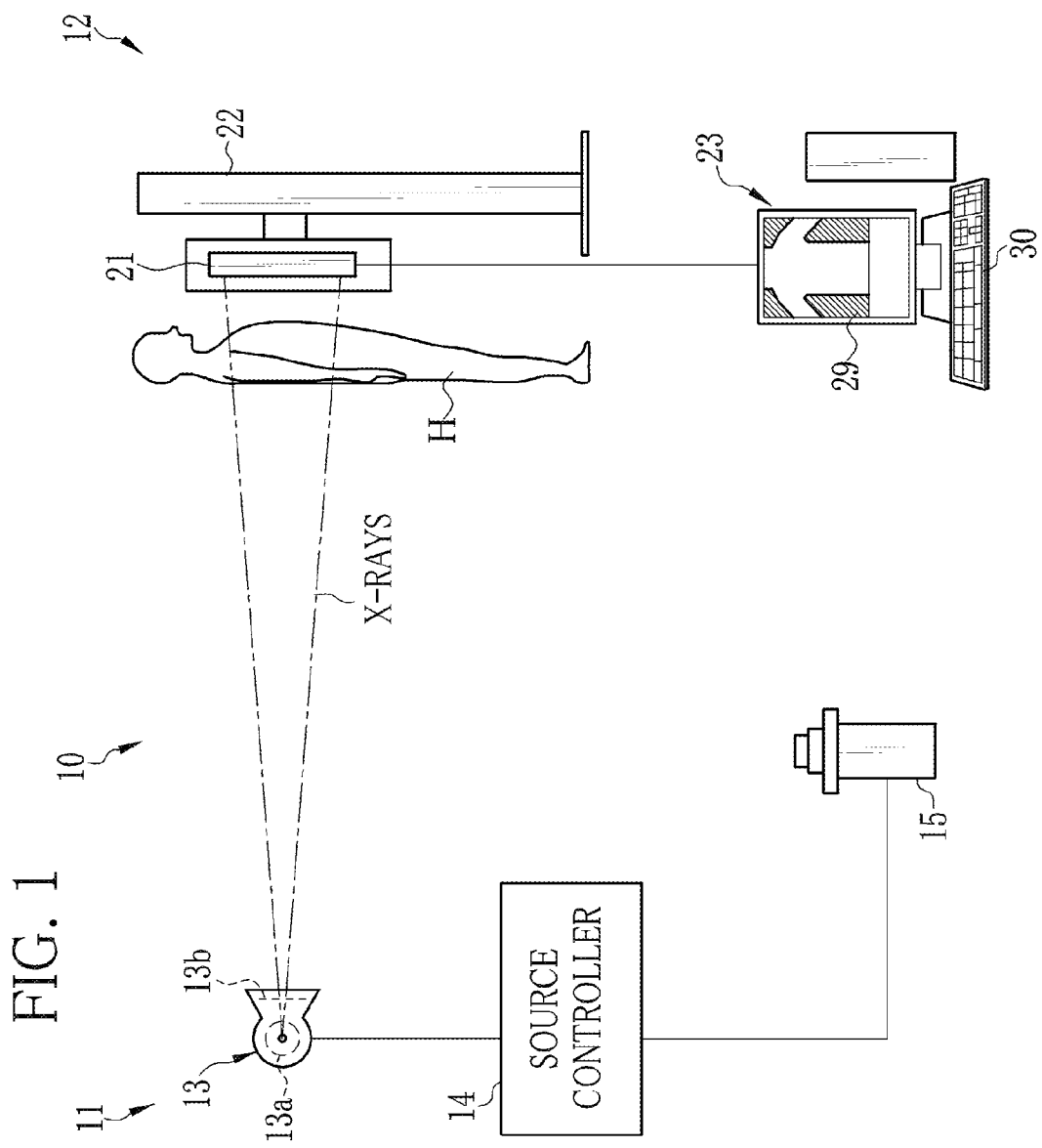
FIG. 1 is a schematic explanatory view of an X-ray imaging system.

As shown in FIG. 1, a radiation imaging system, for example, an X-ray imaging system 10 is constituted of an X-ray generation device 11 and an X-ray image capturing device 12. The X-ray generation device 11 has an X-ray source 13, a source controller 14 for controlling the X-ray source 13, and an exposure switch 15. The X-ray source 13 has an X-ray tube 13a for emitting X-rays, and a collimator 13b for limiting an irradiation field of the X-rays emitted from the X-ray tube 13a.

The X-ray tube 13a has a cathode composed of a filament for emitting thermoelectrons, and an anode (target) for radiating the X-rays by collision of the thermoelectrons emitted from the cathode. The collimator 13b is composed of, for example, a plurality of X-ray shielding lead plates disposed along each side of a rectangle so as to form a rectangular irradiation opening in a middle through which the X-rays propagate. Changing the position of the lead plates can vary the size of the irradiation opening to limit the irradiation field.

As is well known, the source controller 14 includes a high voltage generator and a controller. The high voltage generator supplies a high voltage to the X-ray source 13. The controller controls a tube voltage for determining an energy spectrum of the X-rays from the X-rays source 13, a tube current for determining an X-ray irradiation amount per unit of time, and an X-ray irradiation duration. The high voltage generator produces the high tube voltage by multiplying an input voltage using a transformer, and supplies drive power to the X-ray source 13 through a high voltage cable. An exposure condition including the tube voltage, the tube current, and the X-ray irradiation duration is set up manually by a radiological technician through an operation panel of the source controller 14. If the source controller 14 can communicate with the console 23 of the X-ray imaging system 12, the exposure condition may be set up through the console 23.

The exposure switch 15 to be operated by the radiological technician is connected to the source controller 14 through a signal cable. The exposure switch 15 is a two-step switch. Upon a press of a first step, a warm-up start signal is issued to start warming up the X-ray source 13. Upon a press of a second step, an irradiation start signal is issued to start emitting the X-rays. These signals are inputted to the source controller 14 through the signal cable.

The source controller 14 controls the operation of the X-ray source 13 based on the signals from the exposure switch 15. Upon reception of the irradiation start signal from the exposure switch 15, the source controller 14 issues a start command to the X-ray source 13 and starts supplying the electric power to the X-ray source 13. Thereby, the X-ray source 13 starts X-ray emission. Concurrently with the start of the electric power supply, the source controller 14 actuates a timer to start measuring time from the start of X-ray emission. After a lapse of the predetermined X-ray irradiation duration set up by the exposure condition, the source controller 14 issues a stop command to the X-ray source 13 and stops the electric power supply. The X-ray irradiation duration varies depending on the exposure condition. In taking a static image, the maximum X-ray irradiation duration is set at the order of approximately 500 msec to 2 sec.

The X-ray image capturing device 12 is constituted of an electronic cassette 21, an imaging support 22, and the console 23. As is widely known, the electronic cassette 21 includes a flat panel detector (FPD) and a portable housing for containing the FPD. The FPD is of a TFT type based on amorphous silicon or a CMOS type based on single crystal silicon. The FPD has a matrix of pixels each of which accumulates signal charge by an amount corresponding to the amount of the X-rays incident thereon. There are two types of FPDs, that is, a direct conversion type for directly converting the X-rays into the signal charge, and an indirect conversion type for converting visible light produced in a scintillator into the signal charge. The FPD accumulates the signal charge on a pixel-by-pixel basis, and converts the accumulated signal charge into a voltage signal at its signal processing circuit. Thereby, the FPD electrically detects the X-ray image, and outputs the X-ray image as digital image data.

The housing of the electronic cassette 21 is in the shape of a rectangular flat box. The external size of the housing is compatible with international standard ISO4090:2001, just as with a film cassette and an IP cassette (also called CR cassette). Thus, the electronic cassette 21 is attachable to an existing imaging support that is designed for the film cassette or the IP cassette. The electronic cassette 21 is detachably attached to the imaging support 22. In addition, the electronic cassette 21 is sometimes used alone in such a way as to be put on a bed under the lying patient or held by the patient himself/herself.

The electronic cassette 21 is of a wireless type, for example. The electronic cassette 21 establishes wireless communication with the console 23 using a radio wave or light such as infrared light, besides establishment of wired communication using a communication cable. The electronic cassette 21 can be operated by an internal battery, besides by utility power through a power cable.

The imaging support 22 has a slot to which the electronic cassette 21 is detachably attached. The imaging support 22 holds the electronic cassette 21 in such a position that an irradiation surface of the electronic cassette 21 faces to the X-ray source 13. As the imaging support 22, an upright imaging support for making an exposure of a patient H in a standing position is shown in the drawing, but a horizontal imaging support for making an exposure of the patient H in a lying position may be used instead.

The console 23 is communicatably connected to the electronic cassette 21 with or without a wire to control the operation of the electronic cassette 21. To be more specific, the console 23 sends an exposure condition to the electronic cassette 21 to set up a signal processing condition of the FPD (including a gain of an integration amplifier for amplifying a voltage corresponding to signal charge, for example). The console 23 also performs synchronization control to synchronize accumulation and readout operation of the FPD with irradiation start and end timing of the X-ray source 13. Furthermore, the console 23 controls turn-on and -off of the electronic cassette 21, and puts the electronic cassette 21 into a power saving mode and a preparation mode.

The console 23 applies various types of image processing such as an offset correction and a gain correction to X-ray image data sent from the electronic cassette 21. The X-ray image after the image processing is displayed on a monitor 29 of the console 23, and its data is written to a storage device 27 and a memory 26 (see FIG. 2) of the console 23. The X-ray image data may be written to another data storage device such as an image server connected to the console 23 through a network.

The console 23 receives an input of an examination order from an input device 30 such as a keyboard. The examination order includes information of a sex and age of the patient, a body portion to be examined, and an exposure direction. The examination order is displayed on the monitor 29. The examination order is inputted from an external system such as a HIS (hospital information system) or a RIS (radiography information system) for managing examination information related to body information and radiography information, or inputted manually by the radiological technician. The radiological technician checks the contents of the examination order on the monitor 29, and inputs the exposure condition suitable for the contents of the examination order from the input device 30 through an operation screen on the monitor 29.

Figure 2:
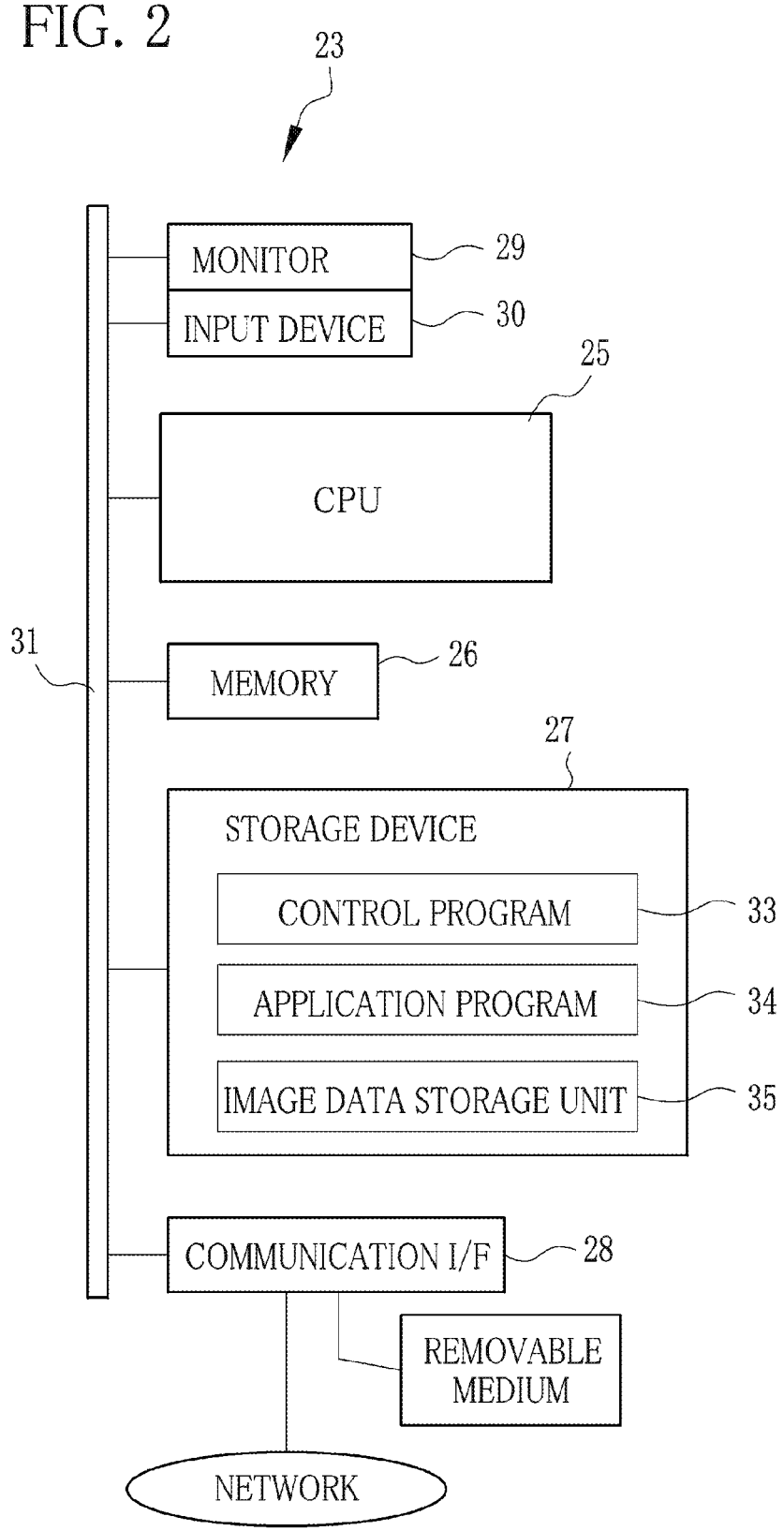
FIG. 2 is a block diagram of a console.

As shown in FIG. 2, the console 23 is composed of a computer having a CPU 25, the memory 26, the storage device 27, a communication I/F 28, the monitor 29, and the input device 30. These components are connected to each other via a data bus 31.

The storage device 27 is a hard disk drive (HDD), for example. The storage device 27 stores a control program 33 and an application program 34. The control program 33 is a program for centralized control of the computer of the console 23. The application program 34 is a program that makes the console 23 perform various functions related to radiography such as display processing of the examination order and the X-ray image, support for decision on the exposure condition, and setup of the exposure condition.

The storage device 27 has an image data storage unit 35 in which a plurality of image files of X-ray image data obtained in past are stored. Each individual image file has a specific ID number. The image file is stored in the image data storage unit in a format compatible with DICOM (Digital Imaging and Communication in Medicine), for example.

Each image file includes an X-ray image and a DICOM tag. FIG. 3 shows the contents of the DICOM tag 36 included in each of the plurality of image files stored in the image data storage unit 35. The DICOM tag 36 is prepared with fields for entering items that include basic information such as the ID number and a name of the patient, an examination ID number, an examination date, and the exposure condition of the X-ray imaging system 10. The image files are retrievable with the use of each item of the DICOM tag 36 as a retrieval query.

The patient ID number and the exposure date of the DICOM tag 36 are collectively called supplementary information. The exposure condition includes an exposure menu, body information, and exposure parameters, for example. The exposure menu includes the body portion, the exposure direction, diagnosis, and the like. The body portion refers to an examined body portion e.g. head, chest, or abdomen. The exposure direction refers to a direction of making an exposure relative to the patient's body e.g. front, side, or oblique. Furthermore, the exposure direction includes information about PA (posteroanterior direction, X-rays are incident on the patient's back) and AP (anteroposterior direction, X-rays are incident on the patient's front) to allow designation of an X-ray application direction. The diagnosis is, for example, lung nodule, lung cancer, leg fracture, and the like.

The body information is information related to the patient body, and includes the patient's body thickness in the X-ray application direction, for example. The exposure parameters are information about settings of the devices composing the X-ray imaging system 10. The exposure parameters include, for example, tube voltage (kV), tube current-time product (mAs), the presence or absence of an optional filter and the type of the optional filter, source-to-image distance (SID), the presence or absence of automatic exposure control setting, and the like.

The memory 26 is a working memory with which the CPU 25 performs processing. The CPU 25 loads the control program 33 from the storage device 27 into the memory 26, and performs processing of the control program 33 to function as a main controller 37 (see FIG. 4), which performs centralized control of each component of the computer and the electronic cassette 21. The communication I/F 28 functions as both a network interface, which controls communication with the external systems such as the RIS, the HIS, the image server, and the electronic cassette 21, and a medium interface, which controls communication with an external storage medium such as a removable medium. The input device 30 includes a keyboard, a mouse, a touch panel integrated with the monitor 29, and the like.

Figure 4:
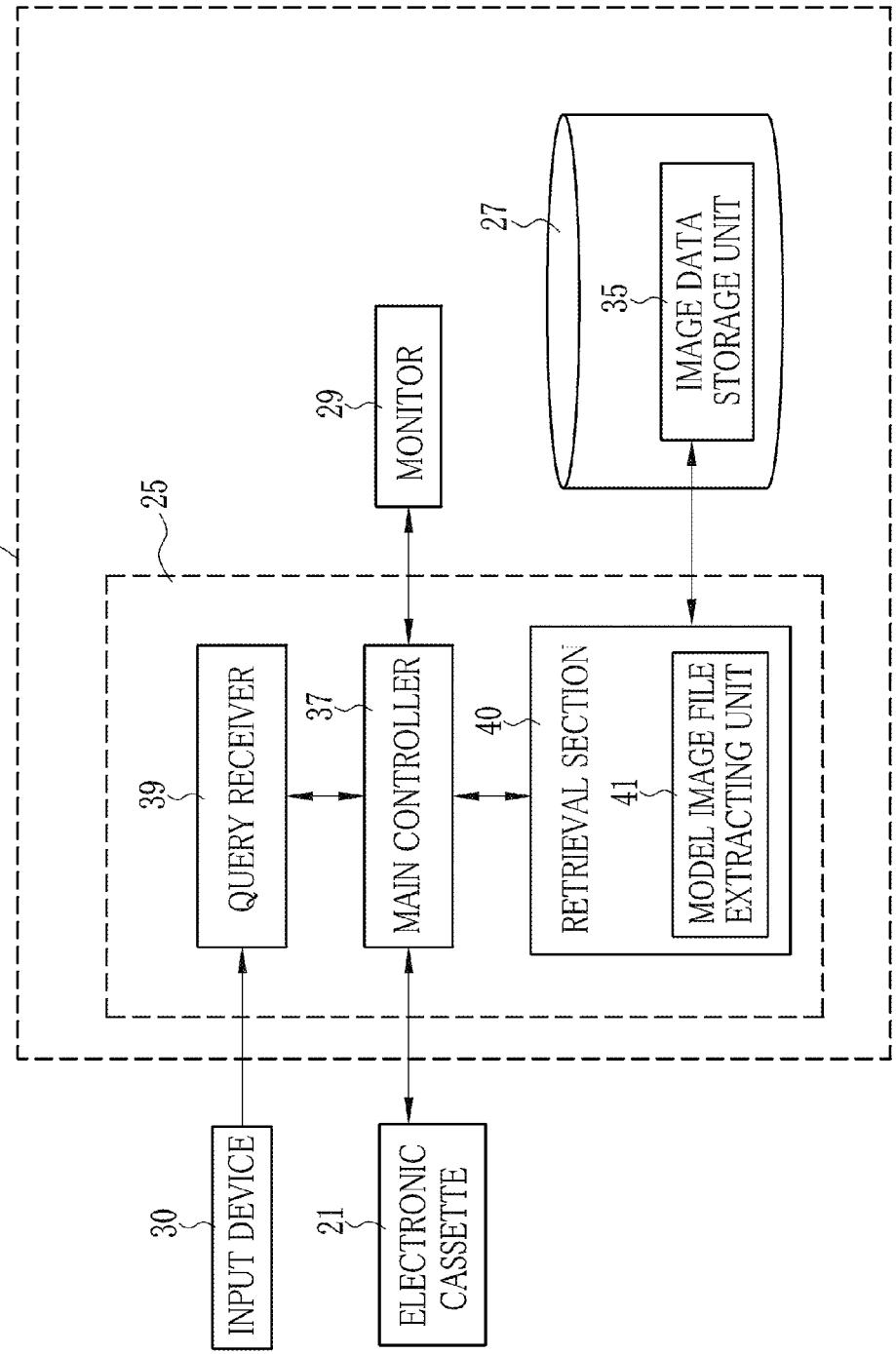
FIG. 4 is a block diagram showing the function of the console in determination of an exposure condition.

In setting up the exposure condition, the console 23 functions as an exposure condition decision support system that supports decision on the exposure condition. To support decision on the exposure condition, out of the past image files stored in the image data storage unit 35, one or more image files having a model image are extracted as model image files. The exposure conditions of the model image files are provided as a reference to determine the exposure condition. As shown in FIG. 4, the CPU 25 of the console 23 functions as a query receiver 39 and a retrieval section 40 by running the application program 34 in setting up the exposure condition.

The query receiver 39 receives a retrieval query with which one or more image files are retrieved from the image data storage unit 35. To be more specific, the query receiver 39 displays on the monitor 29 a first query input window and a second query input window at predetermined timing, to receive an input of a first query and a second query from the input device 30.

Each of the first and second queries includes one or more items of the exposure condition that are determined without the necessity of judgment of the radiological technician, in other words, do not vary depending on the skill level of the radiological technician. In this embodiment, for example, the body portion and the exposure direction are assigned as the first query. The diagnosis and the body information are assigned as the second query. Note that, the first and second queries may be automatically inputted from the examination order and information that the X-ray imaging system 10 itself possesses. If preliminary radiography is performed before actual radiography, the body information may be automatically inputted from a result of the preliminary radiography. In another case, the body information may be automatically inputted based on the past image file of the same patient.

The retrieval section 40 has a model image file extracting unit 41 that extracts the model image files composing a population from which reference image files are retrieved. The model image file has the model image, which is a past X-ray image reliably used for diagnosis without the need to perform re-exposure. The model image is regarded as the X-ray image adequate for diagnosis obtained by a one-time exposure, so it is conceivable that a proper exposure condition was set up in capturing the model image. Therefore, such a mode image file is used as a reference to determine the exposure condition.

Figure 5:
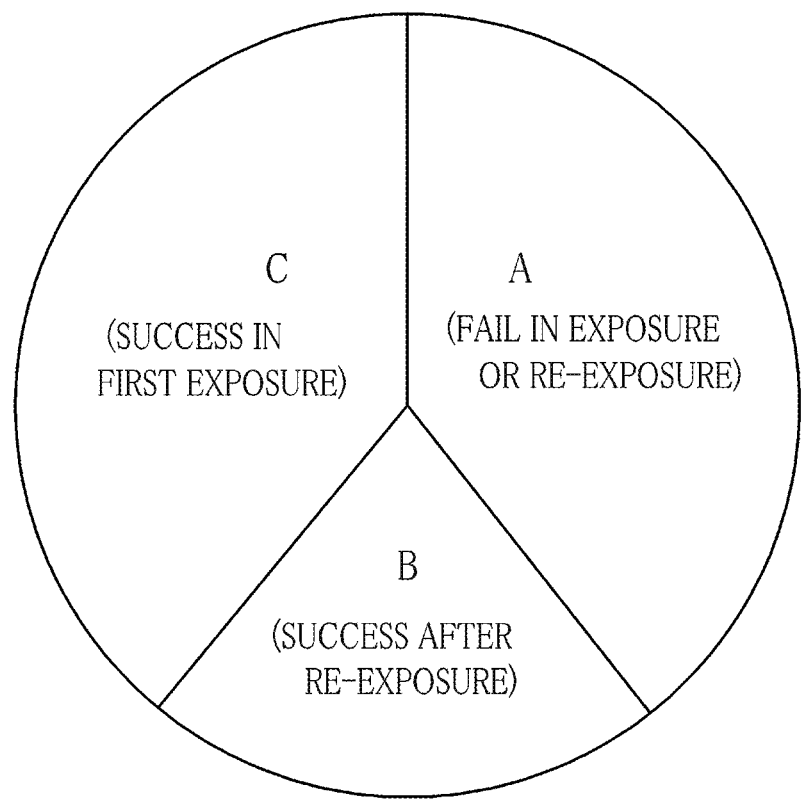
FIG. 5 is a graph showing occurrence rates of failure images and model images collected in a medical institution.

FIG. 5 shows the occurrence rates of proper images, failure images, and the like out of the past X-ray images collected in a medical institution. In the graph, an area "A" represents the rate of cases where a plurality of exposures are carried out within a fixed time period with the use of the same exposure menu (body portion and exposure direction) and the change of an X-ray dose, in other words, the cases of making the failure images and re-exposure images. An area "B" represents the rate of cases where the proper image adequate for diagnosis is obtained in the re-exposure. An area "C" represents the rate of cases where a plurality of exposures are not carried out within the fixed time period with the use of the same exposure menu and the change of the X-ray dose, in other words, the cases of obtaining the proper image (model image) by one-time exposure.

As is apparent from FIG. 5, the image data storage unit 35 stores many failure images and re-exposure images. Thus, if the reference image file is retrieved from all the image files stored in the image data storage unit 35, it can happen that the image files of the failure and re-exposure images are provided. The failure and re-exposure images are likely to be taken by the low-skilled radiological technician, so the use of the exposure conditions of the failure and re-exposure images as the reference increases the possibility of failure in radiography. Also, the retrieval from all the image files of the image data storage unit 35 may take long time, and increase the number of the retrieved image files, and resulting in confusion. The model image file extracting unit 41 extracts the past image files adequate for diagnosis as the model image files from the image data storage unit 35.

A model image file extraction process by the model image file extracting unit 41 will be described with referring to a flowchart of FIG. 6. The model image file extracting unit 41 excludes the improper image files included in the areas "A" and "B" of FIG. 5, and extracts the proper image files included in the area "C" as the model image files from the image data storage unit 35. To be more specific, the model image file extracting unit 41 refers to the patient ID number of the DICOM tags 36, and finds out a plurality of image files having the same patient ID number (S101).

For example, in FIG. 3, examinations of ID #501, #504, and #552 have the same patient ID #00301. Examinations of ID #550 and #554 have the same patient ID #00342.

The model image file extracting unit 41 refers to the exposure date of the plurality of image files having the same patient ID number in the DICOM tags 36, and calculates an exposure interval between a pair of prior and subsequent image files the exposure dates of which are the nearest to each other (S102). For example, in the case of FIG. 3, the exposure intervals between the examination ID #501 and #504, between the examination ID #504 and #552, and between the examination ID #550 and #554 are calculated.

The model image file extracting unit 41 compares each exposure interval with a predetermined threshold value in order to judge whether or not the pair of X-ray images obtained at the calculated exposure interval are the failure and re-exposure images (S103). The threshold value is set at a typical time interval required from failure in prior exposure to completion of re-exposure. For example, the typical time interval includes time to judge after completion of the prior exposure whether or not the prior image is suitable for diagnosis, time to determine the exposure condition for the re-exposure if the prior image is the failure image, time to perform the re-exposure, and the like. Note that, the time required for the re-exposure varies in accordance with the structure the X-ray imaging system 10, a work flow of the medical institution, and the like, and is preferably on the order of one week to one month, for example. By appropriately setting the threshold value, the image files obtained as follow-up observation, a routine medical examination, and the like can be added to the model image files.

If the exposure interval between the pair of prior and subsequent images is less than the threshold value, the model image file extracting unit 41 judges the prior image to be the failure image and the subsequent image to be the re-exposure image, and assigns neither of the prior and subsequent image files as the model image file (S104). If the exposure interval is the threshold value or more, the model image file extracting unit 41 judges that the proper image suitable for diagnosis was obtained by one-time exposure, and assigns the subsequent image file as the model image file (S105). The above S102-S105 are repeated a number of times corresponding to the number of the image files having the same patient ID number (S106).

If the threshold value is set at one week, in an example of FIG. 3, the exposure intervals between the examination ID #501 and #504, and between the examination ID #550 and #554 are less than the threshold value. Thus, the X-ray images of the examination ID #501, #504, #550, and #554 are judged to be the failure images and the re-exposure images, and excluded from the model image files. On the other hand, the exposure interval between the examination ID #504 and #552 is twelve days, which is more than the threshold value, so the examination ID #552 is assigned to the model image file.

As for the image files that do not have the same patient ID number e.g. the examination ID #502, #503, #505, and the like, the model image file extracting unit 41 judges that these image files have the proper image suitable for diagnosis obtained by one-time exposure, and assigns these images files as the model image files (S107). FIG. 7 shows an example of the model image files 43 extracted from the image data storage unit 35. Note that, if there are no pair of image files having the same patient ID number in the above S101, it is judged that neither failure image nor re-exposure image exists, so all the image files are preferably assigned as the model image files.

The retrieval section 40 retrieves the image files matching the first query from the model image files 43 extracted by the model image file extracting unit 41 (S108). For example, the first query designates "chest" as the exposed body portion and "front" as the exposure direction, so the image files having the examination ID #505, #506, #551-#553, and #556 are retrieved from the model image files 43 of FIG. 7.

Upon receiving a retrieval result of the retrieval section 40, as shown in FIG. 8, the main controller 37 displays a first retrieval result window 45, which represents the first retrieval result, on the monitor 29. The first retrieval result window 45 displays an X-ray image 46*a* and an exposure condition 46*b* of each retrieved image file separately from one examination ID to another. All the retrieved image files can be scrolled through in the first retrieval result window 45. If an objective exposure condition is found out from the first retrieval result, its exposure condition can be chosen as the reference exposure condition with a mouse pointer 47, which is operated from the input device 30.

In a case where many image files are retrieved by the first retrieval and the reference exposure condition is difficult to find out, second retrieval is carried out. The retrieval section 40 retrieves the image files matching a second query from the first retrieval result. For example, the second query designates "lung cancer" as the diagnosis and "body thickness of 190 mm" as the body information, so the image files having the examination ID #506, #552, and #553 are retrieved from the model image files 43.

Upon receiving a retrieval result of the retrieval section 40, the main controller 37 displays a second retrieval result window, which is similar to the first retrieval result window 45, on the monitor 29, so the reference exposure condition can be chosen from the second retrieval result window using the input device 30. Since the number of the image files included in the second retrieval result is less than that in the first retrieval result, in general, it is possible to more easily find out the reference exposure condition from the second retrieval result than from the first retrieval result. Also, the contents of the image files included in the second retrieval result are closer to objective exposure contents than those in the first retrieval result, so it is possible to choose the more proper exposure condition, when compared with the case of choosing the exposure condition from the first retrieval result.

In the first retrieval result window and the second retrieval result window, as shown in FIG. 8, an index value, for example, an S value 46*c* is displayed together with the X-ray image 46*a* and the exposure condition 46*b* as a reference to determine the exposure condition. The S value is a read sensitivity value obtained from a histogram of an X-ray dose applied to the electronic cassette 21, and used as an index of an application dose for control of the image quality and the application dose. The higher the S value, the better the exposure is regarded to have succeeded with a little amount of the application dose. Note that, the index value displayed together with the retrieval result is not limited to the S value, but may be an EI value or a REX value being an index of the X-ray dose.

Next, how to determine the exposure condition in the above structure will be described with referring to a flowchart of FIG. 9. Running the application program 33, the CPU 25 of the console 23 functions as the query receiver 39 and the retrieval section 40. The query receiver 39 displays the first query input window on the monitor 29 through the main controller 37, and receives an input of the first query from the input device 30.

When the first query, including the exposed body portion and the exposure direction, is inputted to the first query input window, and a retrieval command is issued (S201), the retrieval section 40 retrieves one or more image files matching the first query out of the model image files, which were used in diagnosis without performing the re-exposure (S202). The processing of S202 is performed by following the flowchart of FIG. 6.

Upon receiving the retrieval result of the retrieval section 40, the main controller 37 displays the first retrieval result window 45, which represents the first retrieval result, on the monitor 29 (S203). To facilitate choosing the proper exposure condition from the first retrieval result, the S value is displayed in the first retrieval result window 45 together with the exposure condition (S204). If the proper exposure condition is found out in the first retrieval result window 45, the proper exposure condition is chosen as the reference exposure condition from the first retrieval result window 45 by the input device 30 (S205).

If many image files are retrieved by the first retrieval and the objective exposure condition is difficult to find out, the second retrieval is carried out. When the second retrieval is commanded from the input device 30 or the like, the query receiver 39 displays the second query input window on the monitor 29 through the main controller 37, and receives an input of the second query from the input device 30. When the second query, including the diagnosis and the body information, is inputted to the second query input window, and a retrieval command is issued (S206), the retrieval section 40 retrieves one or more image files matching the second query out of the first retrieval result (S207).

Upon receiving the retrieval result of the retrieval section 40, the main controller 37 displays the second retrieval result window, which represents the second retrieval result, on the monitor 29 (S208). As in the case of the first retrieval, the S value is displayed in the second retrieval result window together with the exposure condition (S209). If the proper exposure condition is found out in the second retrieval, the proper exposure condition is chosen as the reference exposure condition from the second retrieval result window through the input device 30 (S210).

Upon the choice of the reference exposure condition from the first or second retrieval result, the main controller 37 switches display of the monitor 29 from the first or second retrieval result window to an exposure condition setting window, and the chosen exposure condition is automatically reflected in the exposure condition setting window. The exposure condition displayed in the exposure condition setting window is used with or without modification. If the displayed exposure condition is modified with the input device 30, the main controller 37 corrects the chosen exposure condition in response to a modification command (S211). When an exposure condition determination command is inputted from the input device 30 in the exposure condition setting window, a setup of the exposure condition is determined (S212).

According to the above first embodiment, as described above, since the reference exposure condition is chosen from the accumulated image files, it is possible to easily determine the exposure condition. The reference exposure condition is retrieved from the reliable model image files, so the reliable exposure condition can be set up. Therefore, it is possible to determine the proper exposure condition regardless of the skill level of the radiological technician. Furthermore, the model image files are extracted based on information stored in the DICOM tag of each image file, so the present invention can be easily applicable to an existing X-ray imaging system without the need for creating a new database.

In the first embodiment, the model image files are extracted with referring to the patient ID number and the exposure date stored in the image data storage unit 35. However, in a second embodiment as shown in FIG. 10, a DICOM tag 50 has an impropriety data entry field in which impropriety data is entered. The impropriety data indicates whether or not the X-ray image is the failure or re-exposure image. The model image file extracting unit 41 extracts the model image files based on the impropriety data. Note that, the impropriety data may indicate only one of the failure and re-exposure images.

According to the second embodiment, as in the case of the first embodiment, it is possible to choose the reliable exposure condition without creating a new database. This embodiment is superior to the first embodiment in retrieval speed of the reference exposure condition, because of eliminating the need for extracting the plurality of image files having the same patient ID number, calculating the exposure interval, comparing the exposure interval with the threshold value, and the like. Note that, if the DICOM tag has an item of assessment of the image quality of the X-ray image, such data may be also used in the extraction of the model image files.

In each of the above embodiments, both the exposed body portion and the exposure direction are used as the first query, but only one of them may be used instead. Both the diagnosis and the body information are used as the second query, but at least one of the diagnosis, the body information, and the configuration information of the X-ray image capturing device 12 may be used as the second query in accordance with the contents of the image data storage unit 35. The configuration information of the X-ray image capturing device 12 includes the presence or absence of AEC control, for example.

The X-ray imaging system 10 having the electronic cassette 21 is described in each of the above embodiments, but the present invention is applicable to another type of X-ray imaging system having an X-ray film or an IP (imaging plate), as long as the X-ray imaging system has a database for storing the supplementary information and the exposure conditions. The present invention is applicable not only to a general X-ray imaging system but also to a mammographic imaging system and the like. In the case of the mammographic imaging system, it is preferable that items specific to mammography are used as the first and second queries, and breast calcification is preferably choosable as the "diagnosis", and fatty or fibrosis is preferably choosable as the "body information".

The present invention is applicable to an imaging system that uses another type of radiation such as γ-rays, instead of X-rays.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An exposure condition decision support system comprising:
    an image data storage unit for storing a plurality of image files, each of said image files including data of a radiographic image, supplementary information, and an exposure condition of said radiographic image stored in relation to each other;
    a query receiver for receiving an input of a retrieval query;
    a model image file extracting unit for extracting one or more of said image files having a model image of said radiographic image as model image files, exclusive of said image files having a failure image or a re-exposure image of said radiographic image, by reference to said supplementary information; and
    a retrieval section for retrieving at least one of said image files having said exposure condition matching said retrieval query out of said model image files.

2. The exposure condition decision support system according to claim 1, further comprising a monitor for displaying said radiographic image and said exposure condition of said retrieved image file.

3. The exposure condition decision support system according to claim 2, wherein if a plurality of said image files are retrieved, said radiographic image and said exposure condition of each of said retrieved image files are displayed in a scrollable manner on said monitor.

4. The exposure condition decision support system according to claim 2, wherein said supplementary information includes an ID number of a patient being an object of said radiographic image and an exposure date of said radiographic image.

5. The exposure condition decision support system according to claim 4, wherein said model image file extracting unit performs the steps of:
checking whether or not there are two or more of said image files belonging to said same patient by reference to said ID number;
if there are two or more of said image files belonging to said same patient, calculating an exposure interval between two of said image files belonging to said same patient by reference to said exposure date, and comparing said exposure interval with a threshold value; and
if said exposure interval is less than said threshold value, judging that one of said two image files has said re-exposure image obtained by re-exposure, and assigning neither of said two image files as said model image file.

6. The exposure condition decision support system according to claim 5, wherein if said exposure interval is said threshold value or more, said model image file extracting unit omits assigning a prior image file of said two image files as said model image file.

7. The exposure condition decision support system according to claim 2, wherein said supplementary information includes impropriety data that indicates whether or not said radiographic image is said failure image obtained by failure in exposure or said re-exposure image obtained by re-exposure after the failure.

8. The exposure condition decision support system according to claim 2, wherein said retrieval section performs first retrieval by use of a first query from said query receiver, and thereafter performs second retrieval if a second query is inputted.

9. The exposure condition decision support system according to claim 8, wherein said first query includes an exposed body portion.

10. The exposure condition decision support system according to claim 9, wherein said first query further includes an exposure direction.

11. The exposure condition decision support system according to claim 8, wherein said second query includes at least one of body information, diagnosis, and configuration information of a radiation imaging system.

12. The exposure condition decision support system according to claim 11, wherein said body information includes body thickness of a patient.

13. The exposure condition decision support system according to claim 3, wherein an index value related to a radiation dose used in taking each of said radiographic images is displayed in list form on said monitor.

14. The exposure condition decision support system according to claim 3, further comprising:
an input device for choosing one of said plurality of image files displayed on said monitor; and
a controller for adopting said exposure condition of said chosen image file as said exposure condition of next exposure.

15. A method for supporting decision on an exposure condition of a radiation imaging system, said radiation imaging system including an image data storage unit for storing a plurality of image files, each of said image files including data of a radiographic image, supplementary information, and an exposure condition of said radiographic image stored in relation to each other, said method comprising the steps of:
receiving an input of a retrieval query;
extracting one or more of said image files having a model image of said radiographic image as model image files, exclusive of said image files having a failure image or a re-exposure image of said radiographic image, by reference to said supplementary information; and
retrieving at least one of said image files having said exposure condition matching said retrieval query out of said model image files.

16. The method according to claim 15, further comprising the steps of:
displaying said radiographic image and said exposure condition of each of said retrieved image files in a scrollable manner on a monitor;
choosing one of said image files displayed on said monitor; and
adopting said exposure condition of said chosen image file as said exposure condition of next exposure.

17. The method according to claim 15, wherein
said supplementary information includes an ID number of a patient being an object of said radiographic image and an exposure date of said radiographic image, wherein
the extracting step further includes the steps of:
checking whether or not there are two or more of said image files belonging to said same patient by reference to said ID number;
if there are two or more of said image files belonging to said same patient, calculating an exposure interval between two of said image files belonging to said same patient by reference to said exposure date, and comparing said exposure interval with a threshold value; and
if said exposure interval is less than said threshold value, judging that one of said two image files has said re-exposure image obtained by re-exposure, and assigning neither of said two image files as said model image file.

* * * * *